Patented June 7, 1927.

1,631,875

UNITED STATES PATENT OFFICE.

EMIL LÜSCHER, OF BASEL, SWITZERLAND, ASSIGNOR TO THE SOCIETY ELEKTRIZI-TATSWERK LONZA, OF GAMPEL AND BASEL, SWITZERLAND.

MANUFACTURE OF STABILIZED METALDEHYDE.

No Drawing. Application filed June 26, 1922, Serial No. 571,041, and in Germany December 3, 1921.

According to the U. S. Letters Patent No. 1,432,387, dated October 17, 1922, metaldehyde can be rendered more stable at high temperatures by eliminating the residual traces which it contains of the catalyzer used in preparing the metaldehyde, or by depriving the catalyzer of the opportunity of coming into action, for example by transforming the catalyzer, either chemically, or physically, into an inactive condition.

I have now ascertained, that ammonium carbonate is particularly suitable for the aforesaid purpose, and that the employment of ammonium carbonate as a stabilizing agent is attended by the further considerable advantage that, by regulating the amount of stabilizing agent added, fuel bodies of various degrees of stability can be obtained from metaldehyde.

For example it has been found that, although the purest metaldehyde is better adapted than less pure metaldehyde for most purposes for which it is desired to employ it as a fuel, already on account of its greater stability at high temperatures, above 30° centigrade, and its consequent more favorable behaviour during transport in hot climates, the less pure metaldehyde possesses also advantages for other purposes by reason of its greater inflammability, and the more vivid flame it gives in burning, and also because the purest metaldehyde, when the flame is extinguished, becomes covered with a slight down of metaldehyde crystals which may be a cause of trouble in mechanically sensitive burners, for example, in pocket apparatuses in which the metaldehyde is pushed forward, in proportion as it burns away, for the purpose of obtaining a uniformly burning flame.

The ammonium carbonate is mixed with the metaldehyde powder before the compression, in a quantity corresponding to the degree of stability desired. Owing to the volatility of the ammonium carbonate, there is no danger of obtaining a not uniform mixture, which otherwise would occur with such feeble addition.

The action of ammonium carbonate on the stability of the fuel bodies thus produced is shown by the following experiments:

Large pressed blocks of metaldehyde were kept, for 16 days, in succession at a constant temperature of 30° C., the loss in weight being ascertained by weighing.

The losses amounted to:

12 per cent with a block of metaldehyde prepared in the ordinary way, 3,5 per cent with a block of metaldehyde containing $\frac{1}{10000}$ of ammonium carbonate, 2 per cent with a block of metaldehyde containing $\frac{2}{10000}$ of ammonium carbonate, 1,5 per cent with a block of metaldehyde containing $\frac{3}{10000}$ of ammonium carbonate.

In all cases it becomes possible to impart to metaldehyde the degree of stability most suitable for the particular purposes for which it is to be employed.

What I claim is:

1. A process of stabilizing metaldehyde consisting in mixing it with ammonium carbonate.

2. A process for obtaining metaldehyde of various degrees of stability consisting in mixing it with a quantity of ammonium carbonate varying with the desired degree of stability.

3. As a new article of manufacture, stabilized metaldehyde containing ammonium carbonate.

In witness whereof I have hereunto signed my name this 13th day of June 1922.

EMIL LÜSCHER.